May 3, 1960   J. M. MORRIS   2,935,177
COMPOSITE STEEL AND GLASS FIBER SPRING
Filed June 13, 1957   2 Sheets-Sheet 1
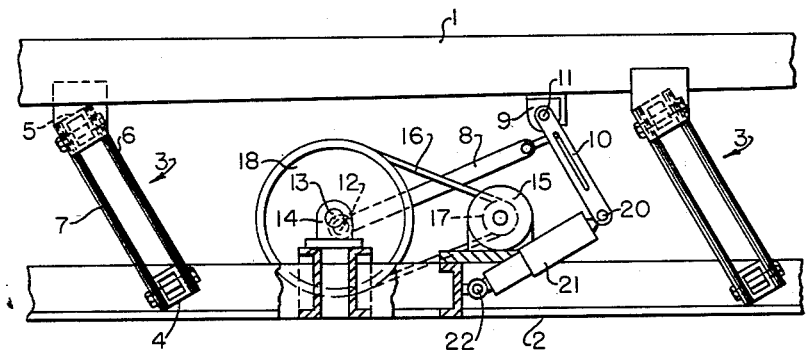
Fig. I
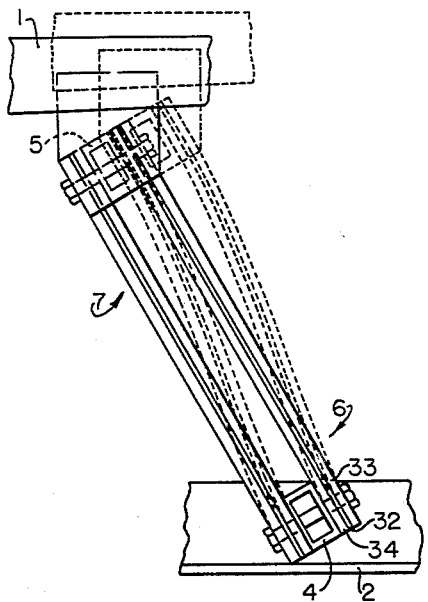
Fig. II
INVENTOR.
JOHN M. MORRIS
BY
Marshall, Marshall & Gastinge
ATTORNEYS May 3, 1960      J. M. MORRIS      2,935,177
COMPOSITE STEEL AND GLASS FIBER SPRING
Filed June 13, 1957      2 Sheets-Sheet 2
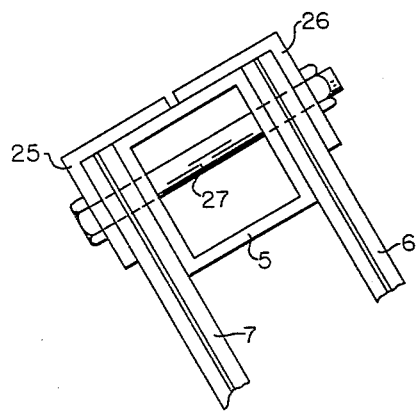
Fig. III
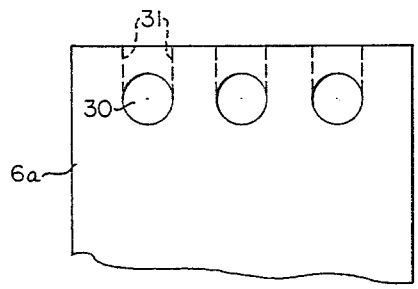
Fig. IV
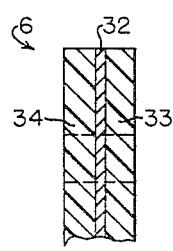
Fig. V
INVENTOR.
JOHN M. MORRIS
BY
Marshall, Marshall & Yeasting
ATTORNEYS United States Patent Office 2,935,177
Patented May 3, 1960

2,935,177
COMPOSITE STEEL AND GLASS FIBER SPRING

John M. Morris, Louisville, Ky., assignor, by mesne assignments, to Chain Belt Company, Milwaukee, Wis., a corporation of Wisconsin Application June 13, 1957, Serial No. 665,530

11 Claims. (Cl. 198—220)

This invention relates to resilient structural members and in particular to an improved resilient member having high fatigue strength and immunity to adverse conditions, and which is an electrical insulator.

One of the difficult problems in connection with designing springs for structural elements, electrical equipment or vibratory equipment is to provide a resilient material for the resilient members of the structure that is not only strong and highly resilient but which is also immune to the action of corrosive vapors and other deleterious ambient conditions to which the equipment may often be subjected. Corrosion of the elements is particularly troublesome because, for example, in a conveyor corrosion of the conveyor bed or other vibratory mass does not materially affect the mass or weight of that member, whereas corrosion of the resilient elements, by weakening or destroying the outer fibers carrying the principal stresses, changes the resilient characteristics enough to throw the system out of tune or out of resonance and thus interferes with its normal operation.

The principal object of this invention is to provide a composite resilient member suitable for use as a highly stressed spring in adverse ambient conditions.

Another object of the invention is to provide a composite spring that is immune to most corrosive atmospheres and materials, that possesses great strength and great resilience, and that has a very high ratio of strength to modulus of elasticity so as to be capable of storing substantial amounts of energy.

A still further object of the invention is to provide an improved composite resilient element which consists of a high strength metallic core plate faced on either side with layers of parallel high strength non-metallic fiber filaments embedded in a hard resin adhesive.

An ancillary object of the invention is to provide an improved resilient element which is capable of withstanding substantial forces as a link or column in addition to being highly efficient as a leaf spring.

More specific objects and advantages are apparent from the following description of a preferred form of the invention.

According to the invention, the improved spring comprises a relatively thin spring steel core faced on each side with a relatively thick skin composed of a plurality of layers of unidirectional high strength filaments, preferably of glass fiber, preferably laid parallel to each other and to the length of the spring and bonded to each other and to the steel by means of a hard resin adhesive.

A preferred form of the invention is illustrated in the accompanying drawings.

Of many commercial applications requiring high strength springs, a vibratory conveyor, particularly in the larger sizes, imposes the most severe requirements as to strength, fatigue life, and immunity to adverse ambient conditions. Accordingly the springs are shown incorporated in a vibratory conveyor.

In the drawings:

Fig. I is a fragmentary side elevation of a portion of a vibratory conveyor utilizing the improved springs.

Fig. II is a greatly enlarged side elevation showing one of the spring assemblies.

Fig. III is a still further enlarged view showing in detail the mounting or attachment of one end of the springs to the conveyor or to the base.

Fig. IV is a fragmentary front elevation of one of the ends of a similar spring indicating a common type of failure that is corrected by means of the steel core plate.

Fig. V is a fragmentary cross-sectional view at enlarged scale of a portion of one of the springs illustrating its general construction.

These specific figures and the accompanying description are intended merely to illustrate the invention and not to impose limitations on its scope.

In a conveyor employing springs constructed according to the invention a vibratory conveyor bed 1 is supported from a stationary base 2 by a number of pairs of springs 3 that are attached to rigid, square or rectangular cross-sectioned tubular cross members 4 of the base and to similar square or rectangular cross-sectioned tubular members 5 attached to the conveyor bed 1. Each pair of springs comprises a first row of springs 6 attached to one side of the square tubular members 4 and 5 and a similar row of springs 7 attached to the other side. As shown in Fig. I, only one of the springs 6 and one of the springs 7 is visible but it is to be understood that more springs lying behind those shown would be employed in an actual structure as shown, for example, in U.S. Patent No. 2,705,070.

Vibratory movement of the conveyor 1 is produced by a crank and connecting rod linkage assembly comprising a connecting rod 8 that is connected through a short arm 9 of a lever 10 to a pivot point 11 attached to the conveyor bed 1 and through a crank 12 on a crankshaft 13 that is journaled in a bearing 14 attached to the base 2. The crankshaft 13 is driven by a motor 15 that is connected through a belt 16 and pulleys 17 and 18 to the crankshaft 13. The speed ratios are arranged so that the vibratory conveyor 1 is driven substantially at its resonant frequency as determined by its mass and the combined stiffness of all of the coupling springs 6 and 7.

In order to allow the conveyor bed 1 to settle under load without imposing a steady load on the connecting rod 8, the drive lever 10 has its normally fixed end 20 connected through a shock absorber 21 to a fixed point 22 of the base 2. The shock absorber 21 has the characteristic of opposing rapid motion but allowing a slow motion to occur between the normally fixed end 20 of the lever 10 and the base 22 to thus accommodate changes in loading of the conveyor 1.

When the system operates at resonance the forces required to decelerate and accelerate the conveyor bed 1 at each end of its stroke are provided by the coupling springs 6 and 7 which in total are adjusted to cooperate with the conveyor bed 1 to form a vibratory system having a natural frequency at the speed of operation. Under this condition with the inertia forces equal to the spring forces the connecting rod 8 need supply only the amount of force required to maintain the vibration, that is, to overcome the losses that may occur due to friction in the load or work being performed on the load.

Fig. II illustrates one of the sets of springs in both its relaxed position and in a stressed condition at one end of its cycle of vibration. It should be noted that the pairs of springs act as guided cantilever beams with the ends of the springs remaining parallel to their rest positions regardless of deflection. Thus bending of the springs does not produce relative rotation between the rectangular cross-section tubular members 4 and 5. The relative rotation between the members which is a natural result of the bending stresses in ordinary cantilever beams is prevented or opposed by several forces, one of which is the stiffness of the conveyor 1 or the base 2. In order that this force may be transmitted from one of the anchors 5 to another the conveyor 1 itself must be very rigid. If the conveyor bed 1 is limber or flexible it assumes an S curve deflection between the various springs thus permitting a certain amount of relative rotation of each of the spring supports 5.

The next force that tends to prevent relative rotation, assuming that the anchor 4 and the base 2 are sufficiently rigid to prevent any rotation of the anchor 4, is the tension or compression forces produced in the springs 6 or 7 acting as parallelogram links to prevent relative rotation of the supports 5 with respect to the supports 4. These forces may be quite large because of the relatively close spacing of the springs 6 and 7.

The amount of the axial stresses in the springs also varies according to the degree of clamping of the ends of the springs. Thus if an end of a spring is not securely clamped it acts as a supported cantilever beam rather than a guided cantilever and thus does not follow the same deflection curve or provide the same spacing between the anchors 4 and 5. This is more clearly apparent when one considers that a supported cantilever which rocks about the support point has a relatively smooth curve without any inflection points between its ends whereas the cantilever that is clamped at each end has a connecting curve having an inflection point at its center. The latter curve actually produces a slightly shorter end to end distance along the chord of the curves than does the simple curve where the cantilever is loaded but not guided at the end. The difference in effective chord lengths produced in the various springs along the length of the conveyor alone and in combination with the thermal stresses that are occasionally set up if the conveyor operates through processing ovens or similar regions of different temperatures may produce quite sizable axial forces in the springs. These forces tend to elongate the bolt holes in the ends of the springs or cause shear failure from the bolt holes to the end of the spring.

In order to prevent frictional losses and to transmit forces from the conveyor 1 to the springs and from the springs to the base 2 with a minimum of localized stresses tending to produce early failure of the springs, the springs 6 and 7 must be securely clamped to the rectangular cross-section tubular members 4 and 5. This is accomplished, as illustrated in the detailed view of Fig. III, by providing L-shape retainers 25 and 26 that fit over the ends of the springs and part way over the surface of the tubular member. These are bolted together with the springs 6 and 7 interposed between the members 4 or 5 and the retainers 25 or 26 by means of bolts 27 extending through the retainers, through the holes in the end of the springs, and through the tubular member 5 itself. When these bolts are securely tightened the retainers 25 and 26 distribute the clamping stress over the entire area of the ends of the springs so as to provide uniform clamping pressure between the retainers and the tubular members.

According to one aspect of the invention the springs 6 and 7 may be of comparatively short length so that the conveyor may be mounted in spaces of limited height and it is therefore necessary that the springs be capable of operating at relatively large amplitudes of vibration in comparison to their length. They must also provide a very large restoring force so as to be able to counterbalance the inertia forces of the heavy conveyor deck 1. This imposes a severe requirement on the material of the springs since it is difficult to procure a material having great strength combined with a relatively low modulus of elasticity. One suitable material for this purpose is longitudinally extending glass fibers embedded in a hard resin adhesive. Whereas spring steel, for example, has an allowable working stress in a vibratory system of 25 to 30 thousand pounds per square inch, its modulus of elasticity is nearly 30 million pounds per square inch. In contrast the glass fiber has approximately the same working strength but its modulus of elasticity is about ⅙ that of steel or approximately 4½ to 5 million pounds per square inch. This means that springs made of the glass fiber and resin may deflect 5 or 6 times as far in response to the same loading and thus store that much more energy.

Springs constructed entirely of longitudinally extending glass fibers have one serious fault. They have a tendency to split parallel to the fibers much as wood has a tendency to split parallel to the grain. As a result of this weakness springs constructed entirely of glass fibers embedded in a hard adhesive and subjected to axial tension loads have shown a tendency to split at the ends of the springs, particularly from the edges of the bolt holes to the ends. This is indicated in Fig. IV showing an end portion of a coreless spring 6a in which bolt holes 30 tend to elongate by shearing along the dotted lines 31 when the springs are subjected to axial tension forces. If these forces become large the end sections from the bolt holes to the end of the spring actually split or shear out completely so as to leave notches in the ends of the spring.

According to the invention this weakness is cured by including in the glass fiber springs a spring steel core as indicated in Fig. V. As constructed the composite spring comprises a thin spring steel core 32 having sufficient strength to withstand the axial tension forces and relatively thick glass fiber and resin facings 33 and 34 adhesively bonded to each side of the steel core. The facings 33 and 34, of a thickness several times the thickness of the core, preferably consist entirely of longitudinally extending glass fibers arranged parallel to each other and parallel to the length of the spring and embedded in a hard adhesive such as an epoxy resin that bonds the fibers to each other and to the steel core. Alternatively if strength is required along other axes some of the fibers may be located parallel to such axes. In this arrangement the steel core has sufficient strength to prevent the end sections, from the mounting holes to the end of the spring, from splitting out and thus provides the shear strength for the spring while the facings of glass fiber filaments bonded to each face of the spring provide the flexural strength that determines the spring rate in bending and the energy storage capacity of the spring.

Bonding the glass fiber filaments to the core has another advantageous result in that it makes a unitary structure out of the various laminations and thus materially increases the moment of inertia of the section and hence its stiffness. Without such bonding to the core the assembly would consist of three separate springs with adjacent surfaces sliding over each other as the springs flex with load. The stiffness of this combination is merely the sum of the individual stiffnesses. The bonding of the assembly into a single unit more than doubles the effective thickness. Since the stiffness of a beam varies as the cube of the thickness the bonding of the various laminations results in a four fold increase in stiffness without any increase in material. The bonding also eliminates any friction which would otherwise occur between the sliding faces of the various laminations of the spring and effectively protects the steel core from corrosive atmospheres or debris that gathers on the springs.

In addition to the improved strength to modulus of elasticity ratio the composite springs are, except for the steel core, electrical insulators. They are thus suitable for use as stressed springs in electrical apparatus in which they are merely clamped in position or are provided with insulated bushings in the bolt holes.

The relatively light weight of the composite spring when compared with springs of equal strength made of other materials makes these composite springs particularly suitable for aircraft use where the strength weight ratio is particularly important.

The glass and resin is itself immune to most corrosive atmospheres or materials and by totally enclosing the steel core makes a high strength material suitable for structural use in practically any environment.

Various modifications in specific details of construction may be made without losing the beneficial results of constructing support springs of parallelly arranged glass fiber filaments bonded to each other and to the sides of a spring steel core that supplies the strength to prevent splitting of the glass fiber assemblies and that is, in turn, protected from corrosion by the fiber and resin.

Having described the invention, I claim:

1. A composite leaf spring having great energy storage capacity and fatigue strength, said composite spring comprising a thin metallic spring plate and a facing on each surface of the plate, said facings each comprising a large plurality of parallelly arranged high strength filaments extending along the length of the spring and embedded in a hard resin that is adhesively bonded to the thin metallic plate and the filaments.

2. In apparatus for doing work by vibration, in combination, a work member and a second member, a plurality of leaf springs holding said members in spaced relation, at least one of said springs comprising a generally flat thin metallic core and a pair of facings, each said facing comprising a large number of high strength filaments that extend parallel to each other and to the longitudinal axis of the spring and that are embedded in a hard adhesive bonded to the thin metallic core and the filaments.

3. In apparatus for doing work by vibration, in combination, a work member and a second member, a plurality of leaf springs holding said members in a generally parallel arrangement, at least one of said springs comprising a great plurality of high strength filaments parallelly arranged in a pair of sheets of substantial thickness, and a thin metallic plate, said sheets of filaments being embedded in a hard resin adhesive bonded to the metallic plate and arranged with one sheet on each face of the metallic plate.

4. In apparatus for doing work by vibration, in combination, a work member, a second member, a composite leaf spring for connecting said members and forming with the members a vibratory system, said composite spring comprising a thin metallic spring plate and a facing on each surface of the plate, said facings each comprising a large plurality of parallelly arranged fiber glass filaments extending along the length of the spring and a hard resin matrix that adhesively bonds the fibers to each other and to the thin metallic plate.

5. In apparatus for doing work by vibration, in combination, a work member, a second member, a plurality of leaf springs connecting the members and forming with the members a vibratory system, at least one of said springs comprising a generally flat thin metallic core and a pair of facings each facing comprising a large number of fiber glass filaments that extend parallel to each other and to the longitudinal axis of the spring and that are embedded in a hard adhesive bonded to the thin metallic core.

6. In apparatus for doing work by vibration, in combination, a work member, a second member, a plurality of leaf springs connecting the members and forming with the members a vibratory system, at least one of said springs comprising a great plurality of fiber glass filaments parallelly arranged in a pair of sheets of substantial thickness, and a thin metallic plate, said filaments being embedded in a hard resin adhesive bonded to the metallic plate.

7. A leaf spring for use in high amplitude vibratory apparatus, said spring comprising a thin spring steel plate serving as a core and a great plurality of longitudinally extending glass fibers embedded in a hard adhesive bonded to each side of the core, said fibers and adhesive on each side of said core being of a uniform thickness that is at least twice the thickness of the core.

8. A leaf spring for use in high amplitude vibratory apparatus, said spring comprising a pair of plates each of substantially uniform thickness and comprising a plurality of longitudinally extending glass fibers embedded in a hard resin adhesive and a spring steel plate interposed between and bonded to each of said pair of plates, said steel plate being less than half the thickness of either of said pair of plates.

9. A leaf spring for use in high amplitude vibratory apparatus in which the spring is subjected to axial forces and to bending forces, said spring comprising a spring steel core adapted to carry the axially imposed loads, and a glass fiber reinforced plastic facing bonded to each face of the core, each facing being at least twice the thickness of the core, each facing comprising a great plurality of glass fiber filaments arranged parallel to each other and to the length of the spring in a hard adhesive that bonds the filaments together and to the spring steel core, said filaments comprising approximately 65% of the volume of the facings.

10. A structural spring of high strength and high resilience comprising a thin metallic core plate and relatively thick facings that enclose the core plate, said facings each comprising a large plurality of glass fiber filaments embedded in a hard adhesive that bonds the filaments together and to the core plate.

11. A structural spring of high strength and high resilience comprising a thin metallic core plate having high strength in shear, and facings covering both sides of said plate, each of the facings having a thickness at least double the thickness of the core plate and comprising a large plurality of longitudinally extending glass fiber filaments embedded in a hard adhesive that bonds the filaments to each other and to the core plate.

References Cited in the file of this patent

UNITED STATES PATENTS

| | | |
|---|---|---|
| 2,062,760 | Overstrom | Dec. 1, 1936 |
| 2,581,532 | Hem | Jan. 8, 1952 |
| 2,665,678 | Bear | Jan. 12, 1954 |
| 2,689,464 | Wurtz | Sept. 21, 1954 |
| 2,712,332 | Annerhed | July 5, 1955 |